UNITED STATES PATENT OFFICE.

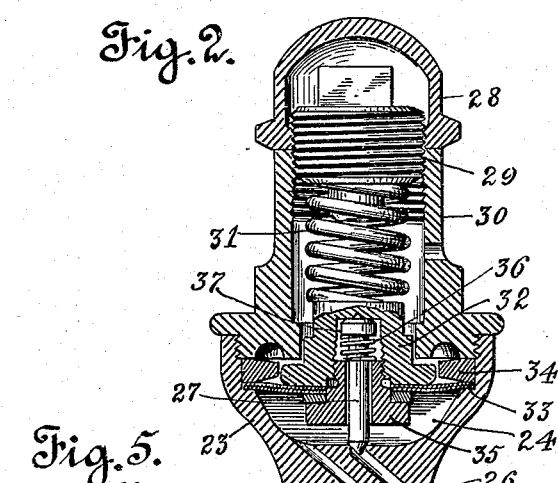

RICHARD W. KELLY, OF LOS ANGELES, CALIFORNIA, ASSIGNOR OF ONE-HALF TO G. E. HARPHAM, OF LOS ANGELES, CALIFORNIA.

PRESSURE-RETAINING VALVE.

942,331.  Specification of Letters Patent.  Patented Dec. 7, 1909.

Application filed February 13, 1909. Serial No. 477,528.

*To all whom it may concern:*

Be it known that I, RICHARD W. KELLY, a citizen of the United States, residing in the city of Los Angeles, county of Los Angeles and State of California, have invented new and useful Improvements in Pressure-Retaining Valves, of which the following is a specification.

My invention relates to a pressure retaining valve to be used in connection with a triple valve, and the object thereof is to provide a pressure retaining valve which can be set to retain a greater pressure in the brake cylinder of a loaded car than in the brake cylinder of an empty car when the auxiliary reservoir is recharged, and which will afford ample release when the brakes are to be released. I accomplish this object by the mechanism described herein and illustrated in the accompanying drawings in which:

Figure 1 is a side elevation of my improved pressure valve retainer. Fig. 2 is a longitudinal central section of the parts shown in Fig. 1. Figs. 3 and 4 are details of the air controlling valve plug and casing surrounding the same. Fig. 5 is a diagrammatic view to show how the retainer is operated from the top of the car.

In the drawings 10 is the casing of the tapered valve chamber 11 in which is rotatively mounted the tapered valve plug 13. In the casing of the valve chamber is the transverse vertical air channel 14, from which leads, at an angle thereto, a branch channel 15 which terminates at the lower edge of the valve chamber as best shown in Fig. 3. The valve plug is provided with a partially circumferential groove 16 which extends a little more than half the circumference of the valve plug as best shown in Fig. 2, and will be called the empty car groove. At one end the groove is extended a still greater distance as best shown at 17 in Fig. 2, but is of less capacity than the other portion of the groove, and will be called the loaded car groove. These grooves are so located in the plug that when in certain positions they connect the upper part of groove 14 with the lower part thereof so that air may pass therethrough. At one side of the empty car groove in the valve plug is another groove 18 which will be called the release groove. This groove preferably extends about one-fourth the circumference of the valve plug, commencing at a point in the valve plug about on a line with the junction of the empty and loaded car grooves and terminating a little to the left of channel 15 when the valve plug is in the position shown in Figs. 2, 3 and 4. This groove registers with the inner end of channel 15 when the valve plug is in the position shown in the drawings and permits the air to pass through channels 14 and 15, and groove 18, and thence to the open air through port 19 in the valve case, which port is shown in dotted lines in Fig. 2 and in full lines in Fig. 4.

The valve casing is provided with a boss 20 on the lower side thereof which is externally screw-threaded and is adapted to be screwed into or connected to the exhaust port of the triple valve, not shown, of any standard air brake mechanism. On the other side of the valve casing is a boss 21 which is internally screw threaded for the reception of an externally threaded boss 22 on the lower end of casing 23 of the pressure retaining valve chamber 24. In this boss and casing is an inlet channel 25, the lower end of which registers with the upper end of channel 14 and then passes upwardly and deflects and opens into the bottom of chamber 24 as best shown in Fig. 2.

Extending through the casing from the center of the bottom of chamber 24 is the discharge channel 26 which terminates at the outer side of the casing. In all other respects the casing and internal mechanism is constructed and arranged like the governor of the Westinghouse automatic air brake mechanism, in which the pin valve 27 controls discharge channel 26. In this construction the upper part of the casing 28 operates as a lock nut for the regulating nut 29 which screws downwardly into the central part of the casing 30 which may be called the spring box, thereby regulating the tension of spring 31 which bears upon the diaphragm spindle 32, which carries the pin valve.

33 is the diaphragm.

34 are the diaphragm rings.

35 is a nut which holds the central portion of the diaphragm secured to the body and holds the pin valve in place.

36 is the pin valve spring to hold the same normally against the top of the recess.

37 is the top of the diaphragm spindle.

The valve plug 13 is provided with a spindle 38 on which is mounted handle 39. This handle is provided with an inwardly projecting stop lug 40, which when the valve plug is in the release position as shown in the drawings engages stop 41 which is secured to casing 10. Spring 42 has one end secured to the casing and is then coiled around the spindle and has the other end bearing against the lug on the handle as best shown in Figs. 1 and 4 and holds the plug normally in the release position. A spiral spring 43 is secured to the outer end of the handle and the other end thereof is secured to connecting rod 44. This connecting rod is pivotally secured to the longer arm of the bell crank lever 45 which is mounted in bearings 46 secured to the bottom of the car. Spring 43 could be omitted and rod 44 made longer. The shorter arm of the bell crank lever is connected to the operating rod 47 which runs to the top of the freight car 48 and is provided with a handle 49. This rod is provided with a turn buckle 50 so that its length can be regulated. It is also provided with lugs 51, 52, and 53 which may be termed release lug, empty car lug, and loaded car lug respectively. A stop lever 54 is mounted by bolt 55 upon the end of the car. This lever is prevented from passing downwardly by stop pin 56, but the same can turn upwardly on its pivot so as to permit the stop lugs to pass upwardly and then it drops to its normal position and holds the operating rod in whichever position the particular stop lug engages the lever. It is provided with a handle 57 which projects above the top of the car so that the operator can place his foot on the top of the same and throw the lever out of the path of movement of lugs 52 and 53 when it is desired to throw the apparatus to full release. This operating rod is adjusted as to length so that lug 51 will engage lever 54 when the valve plug is at full release as shown in the drawings.

A caution lug 58 may be secured to the operating rod in such position that it will engage caution lever 59 whenever lug 52 passes lever 54 and prevent the upward movement of the operating rod until lever 59 is moved out of the path of movement of lug 58. The object of this cautionary lug is to prevent the valve plug from being set to the loaded car position inadvertently. Casing 10 is also provided with a stop lug 60 which is engaged by lug 40 of the handle to limit the movement of the handle whenever the valve plug has been rotated to bring groove 17 into register with the lower portion of channel 14. At this time lug 53 is brought so as to be held against passing downwardly by lever 54, and in this position the valve plug is in what is termed the loaded position. When lever 54 is engaged by lug 52, valve plug 13 is in position so that groove 16 connects the upper and lower portions of channel 14 and the valve plug is in the position termed the empty car position. In this construction spring 31 is set at whatever tension it is desired to have the pressure retained in the brake cylinders when the auxiliary reservoirs are recharged. If we assume that the tension of the spring is set at 20 pounds then when the cars are going down grade, on those cars which are empty, operating rod 47 would be raised until lug 52 was engaged by lever 54 and held in an elevated position. This would bring handle 39 to a midway position between lugs 41 and 60. On the loaded cars the operating handle would be raised until lug 53 is engaged by lever 54 and held in an elevated position thereby. This will bring the handle 39 against stop lug 60. Now when it is necessary to recharge the auxiliary reservoirs, air escapes from the brake cylinders through the triple valves, passes up through channel 14 and groove 16 on the empty cars and through channel 25 into chamber 24, thereby moving the diaphragm upwardly and carrying the pin valve to uncover channel 26 when the air escapes to the atmosphere. It will be observed that an air pressure of 20 pounds will be maintained in the brake cylinders of the empty cars until the valve plug is brought to release position. On the loaded cars, however, the air will pass through channel 14 and groove 17 and channel 25 into chamber 24. But as channel 17 is of a very restricted area, it is obvious that the air cannot get into chamber 24 as quickly through groove 17 as it can through groove 16. Therefore a much higher pressure is retained in the brake cylinders of the loaded cars than in the brake cylinders of the empty cars while the auxiliary reservoirs are being recharged. The difference of area between grooves 16 and 17 is regulated so as to maintain the required difference of braking power between the empty and the loaded cars.

If desired a weighted valve can be used to control the escape of air through channel 26 instead of the use of the pin valve, diaphragm and spring.

By making grooves 16 and 17 of sufficiently small capacity the other mechanism could be dispensed with, but I prefer to use the other mechanism, as in some cases it would be desirable to release the brakes more quickly than could be accomplished if the grooves were small enough to retain the desired pressure in the brake cylinders while the auxiliary reservoirs were being recharged. By having the release port and channel separate from the pressure channel dirt is prevented from getting into the pressure retaining chamber.

Having described my invention what I claim is:

1. A pressure retaining valve mechanism comprising a valve casing having a longitudinal valve chamber in said casing and having a transverse channel therethrough and a branch channel running from the lower portion of the transverse channel and terminating in the valve chamber at one side of the transverse channel, said casing also having a port opening through the side thereof at a distance from the transverse channel; a valve plug in said chamber having a circumferential groove extending nearly around said plug and being of less capacity at one end thereof and adapted when the valve plug is in certain positions to connect the upper and lower ends of the transverse channel, said plug also having a circumferential groove at one side of the other groove, said last groove being adapted to connect the branch channel with the port when the plug is in the release position.

2. A pressure retaining valve mechanism comprising a valve casing having a valve plug therein, said casing having ports and channels therein and said plug having a plurality of peripheral grooves of different capacities and adapted to be operated at different times to connect parts of a channel or parts of a channel and a port, substantially as described herein.

3. A pressure retaining valve mechanism comprising a valve chamber casing having a longitudinal valve plug therein, said valve casing having a transverse channel therethrough and a branch channel in the lower part and a port at one side of said channel, said plug having a long peripheral groove of a less capacity at one end than at the other and adapted at certain positions of the valve plug to connect the upper and lower ends of the transverse channel, said plug also having a shorter peripheral groove at one side of the longer groove adapted to connect the branch channel and the port at the other position of the plug.

4. A pressure retaining valve mechanism comprising a casing having a longitudinal valve plug therein, said valve casing having a transverse channel therethrough and a branch channel in the lower part terminating at the valve plug, and a port at one side of said channel, said plug having a long peripheral groove of less capacity at one end than at the other end, adapted when the valve plug is at certain positions to connect the upper and lower ends of the transverse channel, said plug also having a shorter peripheral groove at one side of the longer groove adapted to connect the branch channel and the port at the other position of the plug; a second valve chamber casing connected to the first valve chamber casing said casing having a channel adapted to register with the channel of the transverse casing and opening into the valve chamber at one side of the center thereof, said casing also having a channel opening from the center of the bottom thereof and extending to the outside of said casing, and a valve in said last casing adapted to control said last channel.

5. A pressure retaining valve mechanism comprising a casing having a longitudinal valve plug therein, said valve casing having a transverse channel therethrough, and a branch channel in the lower part terminating at the valve plug, and a port at one side of said channel, said plug having a long peripheral groove of less capacity at one end than at the other end adapted when the valve plug is at certain positions to connect the upper and lower ends of the transverse channel, said plug also having a shorter peripheral groove at one side of the longer groove adapted to connect the branch channel and the port at the other position of the plug; a second valve chamber casing connected to the first valve chamber casing said casing having a channel adapted to register with the channel of the transverse casing and opening into the valve chamber at one side of the center thereof, said casing also having a channel at one side of the center of the bottom thereof and extending to the outside of said casing and a spring pressed valve in said last casing adapted to control said last channel.

In witness that I claim the foregoing I have hereunto subscribed my name this 3rd day of February, 1909.

RICHARD W. KELLY.

Witnesses:
G. E. HARPHAM,
S. B. AUSTIN.